(12) United States Patent
Shako et al.

(10) Patent No.: US 9,348,058 B2
(45) Date of Patent: May 24, 2016

(54) METHOD FOR DETERMINING THE PROFILE OF AN INFLOW AND THE PARAMETERS OF A WELL-SURROUNDING AREA IN A MULTIPAY WELL

(75) Inventors: Valiry Vasilievich Shako, Moscow (RU); Vyacheslav Pavlovich Pimenov, Moscow (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 996 days.

(21) Appl. No.: 13/519,570

(22) PCT Filed: Dec. 31, 2009

(86) PCT No.: PCT/RU2009/000759
§ 371 (c)(1),
(2), (4) Date: Oct. 9, 2012

(87) PCT Pub. No.: WO2011/081552
PCT Pub. Date: Jul. 7, 2011

(65) Prior Publication Data
US 2013/0138348 A1    May 30, 2013

(51) Int. Cl.
*E21B 47/00* (2012.01)
*E21B 47/07* (2012.01)
(Continued)

(52) U.S. Cl.
CPC ........... *G01V 9/005* (2013.01); *E21B 43/14* (2013.01); *E21B 47/00* (2013.01); *E21B 47/065* (2013.01); *E21B 49/008* (2013.01); *G06F 17/00* (2013.01); *E21B 47/1005* (2013.01)

(58) Field of Classification Search
CPC ...... E21B 21/08; E21B 47/00; E21B 47/0003

USPC ............. 166/64, 250.01, 250.07; 703/10; 702/12; 73/152, 12, 152.29, 152.13, 73/152.33
See application file for complete search history.

(56) References Cited

U.S. PATENT DOCUMENTS 4,520,666 A * 6/1985 Coblentz et al. ........... 73/152.33
5,353,873 A * 10/1994 Cooke, Jr. ........... E21B 47/1005
166/64
(Continued)

FOREIGN PATENT DOCUMENTS

RU    2121572 C1    11/1998
RU    2249108 C1    3/2005
(Continued)

OTHER PUBLICATIONS

Charles V. Millikan and Carroll Sidwelll; "Bottom-hole Pressures in Oil Wells;" Oct. 1930, Amerada Petroleum Corporation, pp. 194-205.*

(Continued)

*Primary Examiner* — Mischita Henson
*Assistant Examiner* — Christine Liao

(57) ABSTRACT

A method for the determination of an inflow profile and bottom-hole area parameters (perforation zone parameters, bottom-hole area pollution parameters) in a multipay well comprises changing a production rate and measuring a temperature of a fluid flowing into the well as a function of time for each pay zone. Then a derivative of this temperature with respect to a logarithm of a time passed after the well production rate has been changed for each pay zone is determined. An inflow profile and other parameters are calculated based on a value of said derivative when it becomes constant and on a time after which the value of the derivative becomes constant.

2 Claims, 3 Drawing Sheets

(51) Int. Cl.
  *E21B 47/103* (2012.01)
  *E21B 49/00* (2006.01)
  *G06F 19/00* (2011.01)
  *G01V 9/00* (2006.01)
  *E21B 43/14* (2006.01)
  *G06F 17/00* (2006.01)
  *E21B 47/06* (2012.01)
  *E21B 47/10* (2012.01)

(56) References Cited

U.S. PATENT DOCUMENTS 5,551,287 A * 9/1996 Maute .................. E21B 47/01
  166/250.01
7,536,905 B2 * 5/2009 Jalali et al. ................. 73/152.33

FOREIGN PATENT DOCUMENTS

SU  1421858 A1  9/1988
WO  9623957 A1  8/1996

OTHER PUBLICATIONS

Valiullin, et al., "A research into thermal field in fluid-saturated porous media", Powder Technology, vol. 148 (1), Oct. 20, 2004, pp. 72-77.

Chekalyuk, E.V., "Termodinamika neftyanogo plasta (Thermodynamics of Oil-Bearing Layer)", Book on Demand Ltd., Moscow, Nedra, 1965, p. 67.

Cheremenski, G.A., "Applied Geothermics", Nedra, Moscow, 1977, pp. 181-182.

* cited by examiner

METHOD FOR DETERMINING THE PROFILE OF AN INFLOW AND THE PARAMETERS OF A WELL-SURROUNDING AREA IN A MULTIPAY WELL

FIELD OF THE DISCLOSURE

The invention is related to geophysical research of oil and gas wells and may be used, particularly, for determination of an inflow profile and a bottom-hole area parameters (perforation zone parameters, bottom-hole area pollution parameters) etc.

BACKGROUND OF THE DISCLOSURE

Parameters of a bottom-hole area are determined during non-stationary operation of a well based on the obtained temperature data of inflows, which, in turn, can be obtained as with known devices, and by means of the device described in this invention.

Thus, the non-stationary operation of the well takes place during starting a well after a long period of inactivity, change of well production, i.e. during situations where temperature of the inflow (s) varies in time.

It is known that one of quantitative characterizing parameters for a bottom-hole area is a well skin factor (S)—a hydrodynamic parameter characterizing an additional filtration resistance to a fluid inflow in the bottom-hole area resulting in reduced production rate as compared with a perfect (ideal) well. The reasons for the additional resistance is a hydrodynamic imperfection of the formation exposing, the bottom-hole area pollution as well as non-linear effects related to high fluid flow velocities in the bottom-hole area porous medium.

Thus, if the skin-factor is close to zero (including the determination error: $-1 < S < 1$), a near-wellbore area is considered unchanged and a well-ideal. The skin-factor large positive value $S > 1$ is an evidence of the near-wellbore area pollution as well as the well imperfection which requires additional influx improvement activities (additional perforation, formation hydraulic fracturing etc.). The skin-factor significant negative value $S < -1$ is observed in case of an increased permeability of the near-wellbore area (cracks, caverns etc.).

Currently well hydrodynamic research methods are known (Buzinov S. N., Umrikhin I. D., *Issledovanie neftyanyx i gazovyx skvažin I plastov*. Moscow, Nedra, 1984 (Survey of Oil and Gas Wells and Formations), enabling determination of skin-factor (among other parameters). However, these methods normally determine average skin-factor value for several operating producing wells simultaneously and do not enable determination of factors setting this skin-factor value, i.e. evaluation of perforation zone parameters and parameters of the bottom-hole area.

On the other hand, from the prior art it is known (see: Chekalyuk E. V., *Termodinamika neftyanogo plasta.*, Moscow, Nedra, 1965, p. 238 (Oil Formation Thermodynamics)) that a temperature of a fluid flowing from a reservoir into a well even from an originally isothermal reservoir varies as a function of time (in technical literature this effect is called a transient Joule-Thomson effect). Data on inflow temperature variations as function of time may be used to determine parameters of a damaged reduced-permeability bottom-hole area (see: Yu. A. Popov, V. P. Pimenov, V. V. Tertychnyi, Developments of Geothermal Investigations of Oil and Gas Fields, Oilfield review, spring 2001, pp. 4-11).

However, this information practically cannot be derived from the inflow data acquired by a wellbore logging. Besides, the theory given in Chekalyuk E. V., *Termodinamika neftyanogo plasta.*, Moscow, Nedra, 1965, p. 238 is true only for a cylindrically symmetrical flow and cannot be used directly for a complex spatial fluid flow structure in a perforation zone.

SUMMARY OF THE DISCLOSURE

The proposed method provides for an increased accuracy of well parameters determination (an inflow profile, perforation zone parameters and bottom-hole area pollution parameters) using temperature measurements of a fluid inflowing into a well during its non-stationary operation, which in addition to the available, for example, hydrodynamic methods, give a more detailed and more accurate evaluation of these parameters.

The method comprises changing a well production rate, measuring temperatures of fluids inflowing into the well as a function of time for each pay zone and determining derivatives of the measured temperatures by a logarithm of a time passed after the well production rate has been changed for each pay zone. Then, a specific production rate q for each pay zone is calculated as $$q = A \cdot \frac{4 \cdot \pi \cdot k_e}{\varepsilon_0 \cdot \eta},$$

where A is a value of the determined derivative when it becomes constant, $\varepsilon_0$ is a Joule-Thomson coefficient, $\eta$—a fluid viscosity, $k_e$—a reservoir permeability. A production rate Q for each pay zone is calculated as $Q = q \cdot h$ where h is a thickness of a pay zone and a well inflow profile is determined as the sum of production rates Q of all the pay zones.

The method can additionally comprise determining a time $t_s$ after which the value of the derivative of the temperature of the fluid flowing into the well by logarithm of the time passed after the well production rate has been changed becomes constant for each pay zone, and determining a temperature change $\Delta T_p$ at an initial stage for each pay zone. Then, a portion of a perforation channel length through which the fluid is flowing into the well for each pay zone is calculated as:

$$\delta = a \cdot \frac{1}{n_p L_p} \frac{\ln(R_p/r_p)}{\ln(r_e/r_s)},$$

where $$a = \frac{\varepsilon_0 \cdot \Delta P}{\Delta T_p} - 1,$$

where $\Delta P$ is a difference between a pressure in the reservoir and a pressure in the well, $$R_p \approx \sqrt{2 \cdot L_p / n_p},$$

$r_p$—a perforation channel radius, $n_p$—number of perforation channels per 1 meter of the well, $L_p$—the perforation channel length, $r_e$—a radius of an external boundary of the reservoir, $r_s$—a radius of an internal boundary of the flow cylindrically symmetrical relative to an axis of the well $$r_s = \sqrt{\frac{\chi \cdot q \cdot t_s}{\pi} + r_w^2}$$

where $$\chi = \left[\phi + (1-\phi) \cdot \frac{\rho_m c_m}{\rho_f c_f}\right]^{-1},$$

$\phi$—porosity, $\rho_m c_m$ and $\rho_f c_f$—volumetric heat capacities of a rock skeleton and the fluid, respectively.

DETAILED DESCRIPTION

Figure 1:
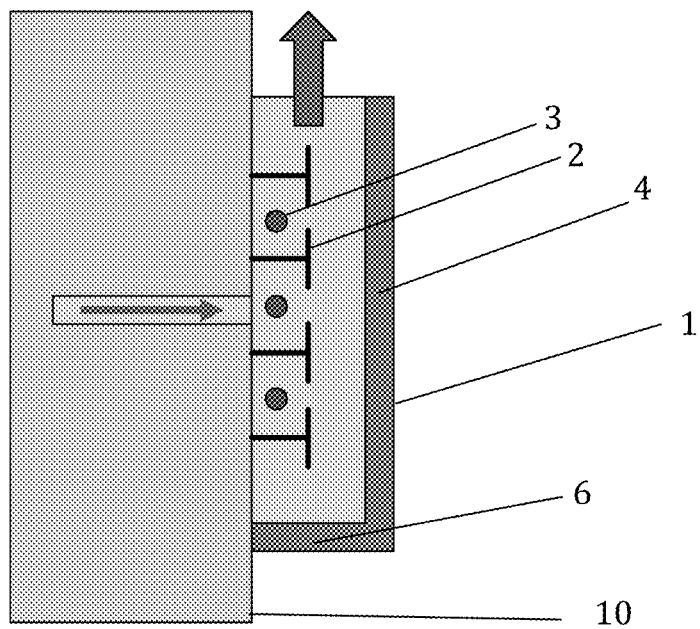
FIG. 1 shows a horizontal cross-section of device which can be used for determining temperature of a fluid inflowing into a well.
Figure 1:
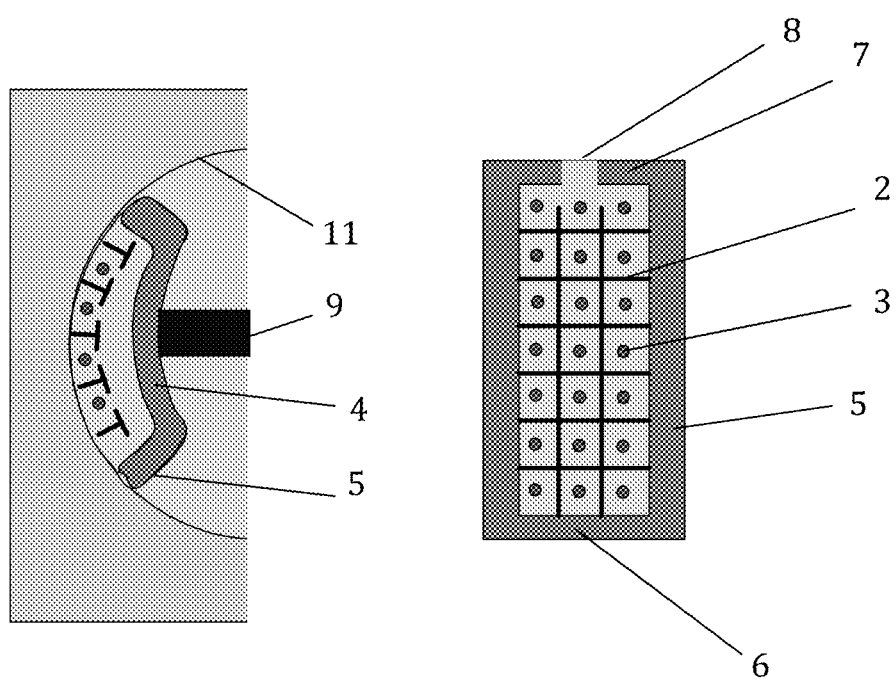

The claimed method can be implemented, for example, with the use of a device shown on FIG. 1.

The device consists of a housing 1, inside the housing 1 a three-dimensional mesh structure of measurement cells 2 is located made of an elastically deformable heat-insulating material. The measurement cells of the mesh structure have an equal height. Each measurement cell is an independent measurement element and contains a temperature sensor 3. The housing 1 consists of a rear wall 4 made from a deformable heat-insulating material, side walls 5 made continuous and tightly interconnected and a cover 6. The side walls 5 are made from an elastically deformable heat-insulating material, for example, an elastic plastic material or rubber. The housing 1 may be additionally equipped with a bottom 7 with at least one opening 8. The bottom 7 is also tightly connected with the rear wall 4 and side walls 5 of the housing 1. The device is equipped with a pressure element 9.

The device operates as follows. The device is sunk into a well and is positioned at the level of a reservoir in an area of a fluid inflow into a casing string 10 in the well and is tightly pressed against a wall 11 using the pressure element 9. A pneumatic spring or another device with a pneumatic, hydraulic or electrical drive capable of tight pressing of the device to the casing string internal surface may be used. The device curvature radius when pressed to the wall 11 of the casing string 10 is equal to the string 10 curvature radius.

At the beginning of the operation the measurement cells are filled with a borehole fluid and temperatures measured with sensors 3 in the cells will have an approximately equal temperature equal to that of the well fluid. Then, the borehole fluid is displaced by a fluid from a pay zone entering the measurement cells located opposite the perforation channels. The temperature in these measurement cells will change quite fast due to a small volume of the fluid contained in a cell. This change will be measured by the temperature sensors 3 located in every measurement cell. In the remaining cells, due to the fact that they are made of a heat-insulating material the temperature will not change for a sufficiently long time.

Therefore it is possible to identify cells in which a temperature of the fluid flowing into the well will be measured.

The fluid that has "worked" in the relevant cells passes through a gap between the mesh structure 2 and the rear wall 4 of the housing and exits the device from its upper part flowing into the main borehole fluid stream.

Fabrication of the walls from a heat-insulating material enables to exclude the effect of heat transfer processes from the main borehole stream on the accuracy of the inflow fluid temperature measurement.

Fabrication of the measurement cells from a heat-insulating material enables heat-insulation of each measurement cell by means of eliminating heat transfer processes via the cells' walls (the neighbouring cells may be filled with different fluids—the inflow fluid and the borehole fluid having different temperatures) which enables measuring of the inflowing fluid temperature with a high accuracy.

On the other hand, the fabrication of the housing walls and the measurement cells from an elastic material ensures the inflow fluid hydroinsulation from the main borehole stream. The mesh structure is placed into the housing cavity so that the inflow fluid flows into the device via this structure (the mesh structure on the one side thereof is the device front wall and the measurement cells are the device inlet openings). When the device is pressed against the casing string both flexibility (elastic deformation) of the housing material and structure cells and hydroinsulation of the inflow fluid from the main borehole fluid stream are provided.

The mesh structure is a set of hollow cells having equal height (in case, for example, of the rectangular shape thereof it can be made as a lattice, made by perpendicularly crossing partitions, spatially it is a parallelepipedon). The shape of the measurement cells and, consequently, that of the mesh structure may be rather diversified. The measurement cells may have an n-angled polygon shape, where n is a number of angles thereof (square, pentagon, hexagon etc.). Anyway, their dimensions must be calculated proportionally to perforation openings and a number of the cells (mesh structure dimensions)—based on the perforation zone parameters.

Thus, a device time constant $\Delta t$ is determined by a volume of a measurement cell $V_{cell}$ and an average production rate of a separate perforation channel $q_p$:

$$\Delta t \approx \frac{V_{cell}}{q_p} \qquad (1)$$

$$q_p = \frac{2\pi \cdot k_e}{\eta \cdot n_p} \cdot \frac{\Delta P}{S + \ln(r_e/r_w)}, \qquad (2)$$

where $\Delta P$ is a difference between a reservoir pressure and a well pressure, $\pi$—mathematical constant equal to 3.14159, $\eta$—a fluid viscosity, $n_p$—a number of perforation channels per 1 meter of the well length in the perforation zone, $k_e$—reservoir permeability, $r_w$ and $r_e$—a well radius and a radius of a reservoir external boundary.

According to the claimed method a well production rate is changed and for each pay zone a temperature $T_{in}$ of a fluid flowing into the well is measured as a function of time $T_{in}=T_{in}(t)$.

Figure 4:
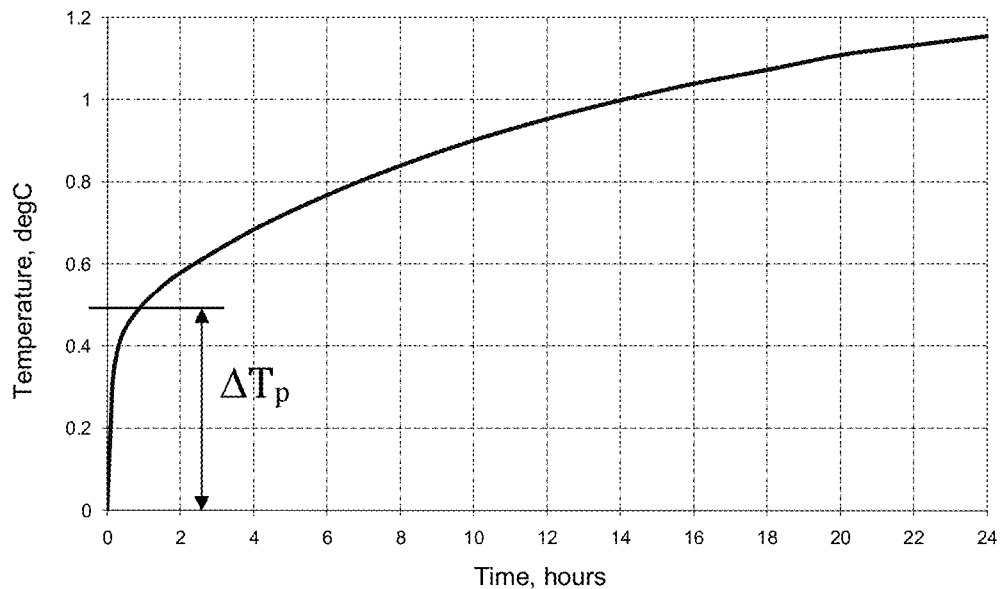
FIG. 4 shows a curve of a temperature of the fluid flowing into the well as a function of time passed after the production start.

The peculiarity of this $T_{in}(t)$ function in a transient regime of the perforated well is a rapid temperature change at an initial stage (the first 20-60 minutes) and slow temperature change (by factor of tens slower than at the initial stage) after 3-5 hours (FIG. 4).

A temperature change $\Delta T_p$ at the initial stage can be determined from the measured $T_{in}(t)$ (FIG. 4).

Figure 5:
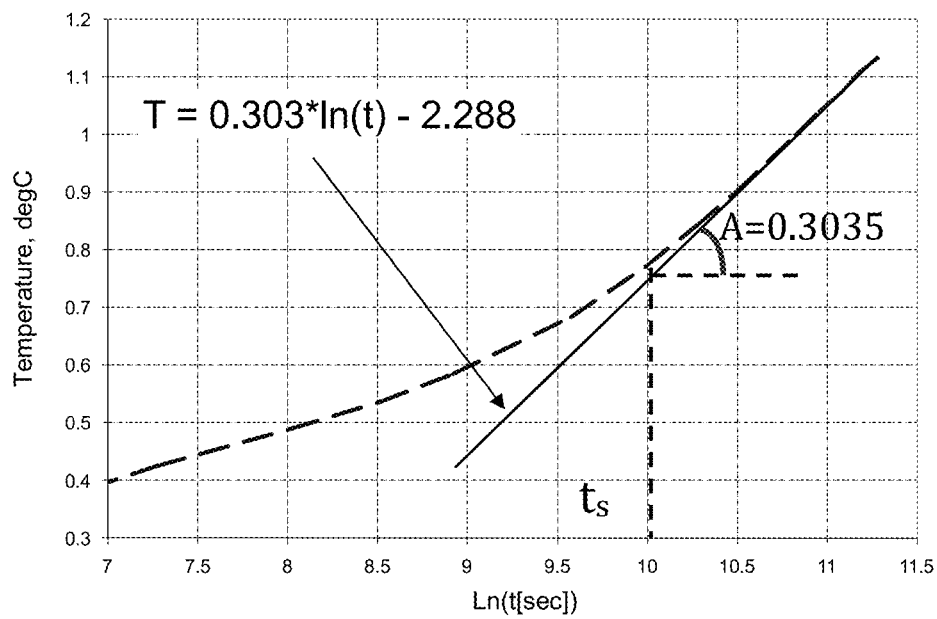
FIG. 5 shows a curve of a temperature of the fluid flowing into the well as a function of the natural time logarithm (in seconds).

A graph of $T_{in}(t)$ as a function of logarithm of time t elapsed after the production start or the well production rate change is plotted (FIG. 5). Time $t_s$ is found after which a slope of a curve (i.e. a derivative by logarithm)

$$\frac{dT_{in}}{d\ln(t)} = f(t)$$

becomes constant:

$$f(t>t_s) \approx const = A \quad (3)$$

and a value of this constant derivative A is found.

This constant value is related to a specific production rate q [m³/m·sec)] (an inflow per a well length unit) and a relevant skin-factor s with the ratios:

$$A = \frac{\varepsilon_0 \cdot \Delta P}{2 \cdot \left(s + \ln\left(\frac{r_e}{r_w}\right)\right)} = q \cdot \frac{\varepsilon_0 \cdot \eta}{4 \cdot \pi \cdot k_e} \quad (4)$$

After that by the value $t_s$ from equation (5) a distance $r_s$ from a well axis ($r>r_s$) may be evaluated, where a fluid flow may be considered cylindrically symmetrical.

$$t_s = \frac{\pi \cdot (r_s^2 - r_w^2)}{\chi \cdot q}, \quad (5)$$

The $r_s$ value as numerical calculations show is proportional to the perforation channel length $L_p$.

Then, using the temperature change $\Delta T_p$ for the initial stage a dimensionless parameter $\alpha$ is calculated:

$$a = \frac{\varepsilon_0 \cdot \Delta P}{\Delta T_p} - 1, \quad (6)$$

which is used, in its turn, to calculate a parameter $\delta$ that evaluates the perforation channel length $L_{p\_act}$, through which the fluid flows into the well $$(\delta = L_{p\_act}/L_p): \quad (7)$$

$$\delta = a \cdot \frac{1}{n_p L_p} \cdot \frac{\ln(R_p/r_p)}{\ln(r_e/r_s)}.$$

where $$R_p \approx \sqrt{2 \cdot \frac{L_p}{n_p}},$$

and $r_p$ is a perforation channel radius.

The value $\delta=1$ means that there is no damage zone around the well and the perforation channel is operable throughout the entire length. With the perforation channels length known, the values of $\delta$ parameter in the interval from 0 to 1 provide the quantitative evaluation of the perforation channel portion via which the fluid flows into the well. If the perforation channels length $L_p$ is unknown, from the same formula (7) the effective length of the perforation channel $L_p\delta$ is determined which simultaneously characterizes the dimensions of the damage zone in the near-wellbore area and the perforation channels' length.

Then production rate Q of each pay zone of the well is determined using the following equation:

$$Q = q \cdot h, \quad (8)$$

where h is a pay zone thickness. The well inflow profile is determined as the sum of production rate values Q for all the pay zones.

Figure 2:
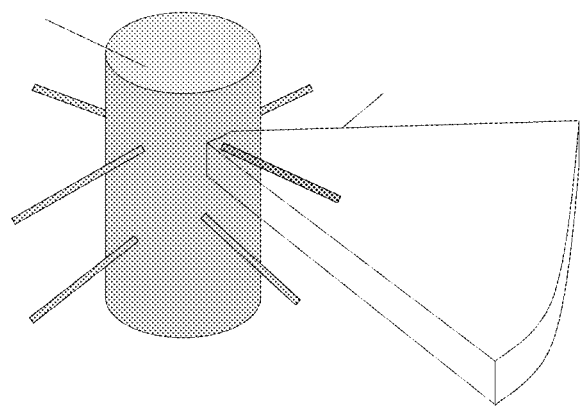
FIG. 2 shows a schematic diagram of a computational area for a fluid flow modeling in a porous medium feeding one perforation channel.
Figure 3:
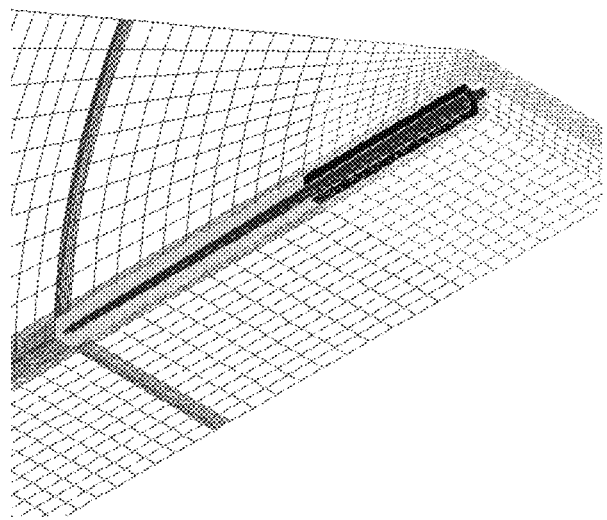
FIG. 3 shows a computational area (grid) for the implementation of the 3D modeling of a flow in a porous medium feeding ¼ of a perforation channel.

The implementation of the claimed method was performed using 3D numerical modeling of heat and mass transfer processes in a porous medium in a perforation zone using commercial software for hydrodynamic and thermal modeling STAR-CD developed by CD-ADAPCO Company. A fluid flow in the area of the porous medium feeding ¼ of a perforation channel was modeled (FIG. 2, FIG. 3).

During the modeling the following calculated parameters were used. Perforation zone parameters: h=0.4 m—height distance and $\phi$=60°—an angle between perforation channels, $n_p$=15—a number of perforation channels per 1 meter of the well length, $r_p$=0.01 m and $L_p$=0.5 m—perforation channel radius and length. Calculation area dimensions—height 0.2 m and angle 30° (FIG. 3), $r_w$=0.1 m—well radius, $r_e$=10 m—outer radius of the calculation area. $P_w$=50 bar—well pressure, $P_e$=100 bar—pressure at the external boundary of the calculation area, $k_e$=10⁻¹³ m²—reservoir permeability, 0.3·$k_e$—reservoir permeability in the stratum with the thickness of 0.2 m around the well, $\phi$=0.2—reservoir porosity, $c_f$=1800 J/(kg·K) and $c_m$=750 J/(kg·K)—specific heat capacities of fluid and rock, $\rho_f$=900 kg/m3 and $\rho_m$=2700 kg/m3—densities of fluid and rock, $\varepsilon_0$=−5·10⁻⁷ K/Pa—Joule-Thomson coefficient, $\eta$=0.01 Pa·s—fluid viscosity.

The numerical modeling resulted in a value of a well mass inflow (¼ of the perforation channel inflow) $g_c$=1.21·10⁻³ kg/s. Volumetric production rate $q_c$ per 1 meter of the well length is calculated using the following equation:

$$q_c = \frac{4 \cdot g_c \cdot n_p}{\rho_f} \approx 8.1 \cdot 10^{-5} \frac{m^3}{m \cdot sec}$$

To check the proposed method this value was found using the curves of inflow temperature as function of time (see. FIG. 4, FIG. 5). From FIG. 5 it can be seen that after the time $t_s \approx e^{10}$ from ≈6 hours the derivative of the temperature by logarithm of time becomes equal to $$\frac{dT_{in}}{d\ln(t)} \approx A \approx 0.3.$$

By using this value in Equation (8) we determined:

$$q_T = A \frac{4 \cdot \pi \cdot k_e}{\varepsilon_0 \cdot \eta} \approx 7.6 \cdot 10^{-5} \frac{m^3}{m \cdot sec}$$

This value $q_T$ virtually coincides with the value of $q_c$ above. Then, using equation (9) and value $t_s$ we found the internal radius of the area in which the flow in the reservoir may be considered cylindrically symmetrical: $r_s$=0.63 m. This value matches the well dimensions and length of the perforation channel $r_w+r_s$=0.6 m.

From FIG. 4 it can be seen that during the first 10-20 minutes the inflow temperature increases by approximately $\Delta T_p$=0.5 K ("fast" stage of the temperature growth at the initial stage), and then the temperature changes relatively slowly. By substituting this value into equation (10) we find a=5 and then, using equation (11) we find δ≈0.8, i.e. the inflow is performed after 80% of the perforation channel length which corresponds to the existence (in the calculated model) of the layer with a reduced permeability around the well.

For the example above geometric dimensions of the device for the inflow fluid measurement were determined. On average the well walls' area of $s_p$ falls on one perforation hole:

$$S_p = n\frac{2\cdot \pi \cdot r_w}{n_p} \approx 0.042 \ m^2$$

In order to ensure that at least 3 perforation channels are in the measurement zone the area of the measurement cell grid must exceed 3 $s_p$. If we admit that the measurement cell grid covers 30% of the well perimeter (the arc length $l_t$=0.2 m) its height $h_t$ must be $$h_t = \frac{9}{n_p} \approx 0.6 \ m$$

What is claimed is:

1. A method for determining an inflow profile and parameters of a bottom-hole area in a multipay well comprising:
    changing a production rate of a perforated multipay well,
    measuring independently for each pay zone a temperature of a fluid flowing into the well from a pay zone through a perforation channel as a function of time, using a sensor located opposite the perforated channel,
    determining for each pay zone a derivative of the measured temperature by logarithm of a time passed after the well production rate has been changed,
    calculating a specific production rate q value for each pay zone as $$q = A \cdot \frac{4\cdot \pi \cdot k_e}{\varepsilon_0 \cdot \eta},$$

where A is a value of the determined derivative when it becomes constant, $\epsilon_0$ is a Joule-Thomson coefficient, η—a fluid viscosity, $k_e$—a reservoir permeability,
    calculating a production rate Q of each pay zone as Q=q·h where h is a thickness of a pay zone and
    determining the well inflow profile as a sum of the calculated production rates Q of all the pay zones.

2. The method of claim 1 additionally comprising:
    determining for each pay zone a time $t_s$ after which the value of the derivative of the measured temperature by logarithm of the time passed after the well production rate has been changed becomes constant,
    determining for each pay zone a temperature change $\Delta T_p$ at an initial stage when there is a fast change of the temperature of the fluid flowing into the well,
    calculating for each pay zone a portion of a length of the perforation channel through which the fluid is flowing into the well as:

$$\delta = a \cdot \frac{1}{n_p L_p} \frac{\ln(R_p/r_p)}{\ln(r_e/r_s)},$$

where $$a = \frac{\varepsilon_0 \cdot \Delta P}{\Delta T_p} - 1,$$

where ΔP is a difference between a pressure in the reservoir and a pressure in the well,
$R_p \approx \sqrt{2\cdot L_p/n_p}$,
$r_p$—a radius of the perforation channel, $n_p$—number of perforation channels per 1 meter of the well, $L_p$—the length of the perforation channel, $r_e$—a radius of an external boundary of the reservoir, $r_s$—a radius of an internal boundary of the flow cylindrically symmetrical relative to an axis of the well $$r_s = \sqrt{\frac{\chi \cdot q \cdot t_s}{\pi} + r_w^2}$$

where $$\chi = \left[\phi + (1-\phi)\cdot \frac{\rho_m c_m}{\rho_f c_f}\right]^{-1},$$

φ—porosity, $\rho_m c_m$ and $\rho_f c_f$—volumetric heat capacities of a rock skeleton and the fluid, respectively, and
    determining a presence and dimensions of a damage zone around the well by the calculated portion of a length of the perforation channel through which the fluid is flowing into the well.

* * * * *